May 16, 1944. K. K. FISCHER 2,348,732
METHOD AND MEANS FOR INDICATING THE VISCOSITY OF FLOWING FLUIDS
Filed Dec. 2, 1940 5 Sheets-Sheet 1

Fig.1.

INVENTOR.
Kermit K. Fischer
BY Leonard L. Kalish
ATTORNEY.

May 16, 1944.   K. K. FISCHER   2,348,732
METHOD AND MEANS FOR INDICATING THE VISCOSITY OF FLOWING FLUIDS
Filed Dec. 2, 1940   5 Sheets-Sheet 4

INVENTOR
Kermit K. Fischer
Leonard L. Kalish
ATTORNEY

Patented May 16, 1944

2,348,732

UNITED STATES PATENT OFFICE 2,348,732

METHOD AND MEANS FOR INDICATING THE VISCOSITY OF FLOWING FLUIDS

Kermit K. Fischer, Philadelphia, Pa., assignor to Fischer & Porter Company, Hatboro, Pa., a corporation of Pennsylvania Application December 2, 1940, Serial No. 368,246

6 Claims. (Cl. 265—11)

The present invention relates to a certain new and useful method of and apparatus for determining the viscosity of fluids in motion and for determining the specific gravity of fluids in motion. More specifically, the present invention relates to a method and apparatus for determining the viscosity or the specific gravity or both the viscosity and the specific gravity of a fluid while such fluid is in motion, as for instance, while said fluid is passing through a pipe line.

The object of the present invention is to provide a simple, dependable and reasonably accurate method for determining and maintaining a constant check on the specific gravity or the viscosity of fluids in motion (or both specific gravity and viscosity), as for instance, fluids in transit in industrial chemical processes, without having to remove any of the fluids from the line. A further object of the present invention is to provide dependable and relatively inexpensive apparatus for measuring and maintaining a constant check upon viscosity or specific gravity, or both, of fluids in motion in pipe lines in industrial chemical plants.

With this object and other objects in view, which will appear more fully from the following detailed description and accompanying drawings, one phase of the present invention consists of a process of measuring specific gravity and/or viscosity of fluids in motion in pipe lines, which consists in passing the liquid or fluid, in series, through a rate-of-flow indicating device relatively insensitive to changes in specific gravity and changes in viscosity of the fluid, and through another indicating device sensitive to the rate-of-flow and the specific gravity of the fluid and relatively insensitive to changes in viscosity of the fluid, and through still another indicating device sensitive to rate-of-flow and to viscosity of the fluid but relatively insensitive to changes in specific gravity of the fluid, and maintaining the rate-of-flow of the fluid constant by reference to the first-mentioned rate-of-flow indicating device while obtaining a viscosity or specific gravity reading upon the other indicators.

Another phase of the present invention consists of a device or apparatus through which fluid may be passed, and which is inserted in a pipe line through which the fluid normally passes (or into a by-pass associated with such pipe line), such device or apparatus including a series of two or more flow-responsive indicators, in series, one being relatively insensitive to variations in specific gravity and viscosity of the fluid, another being relatively insensitive to specific gravity changes but sensitive to viscosity changes, and the other being relatively insensitive to viscosity changes but sensitive to specific gravity changes, whereby the specific gravity and viscosity of the fluid may be indicated by maintaining the rate-of-flow constant whenever a reading is desired.

The present invention further consists of other novel phases, features and constructions all of which will appear more fully from the following description and accompanying drawings.

Referring to the accompanying drawings, in which like reference characters indicate like parts throughout.

The apparatus according to one embodiment of the present invention (for determining the viscosity and specific gravity of a fluid passing, for example, through a pipe line) includes a rotameter 10 which is affected only by rate-of-flow changes (and which is relatively independent of variations in viscosity or specific gravity), another rotameter 11 which is affected by the rate-of-flow and by changes in specific gravity alone (and is more or less independent of changes in viscosity) and a third rotameter 12 which is affected by the rate-of-flow and by changes in the viscosity alone (and which is relatively independent of changes in specific gravity).

Figure 1:
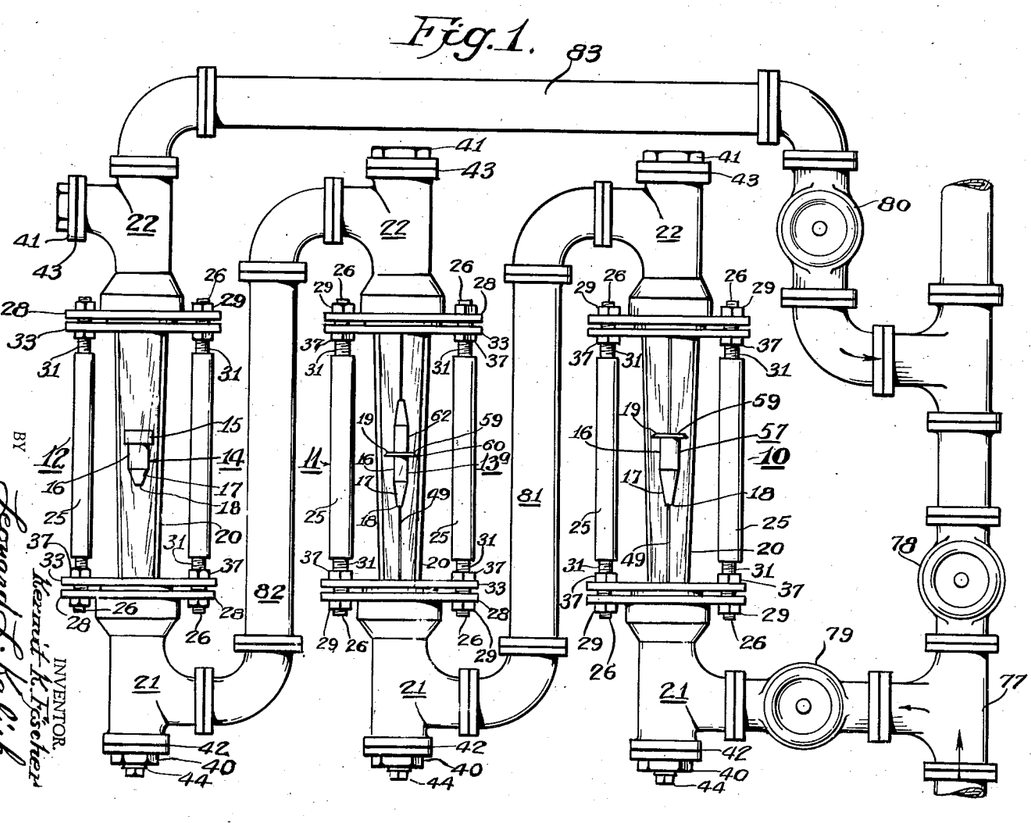
Figure 1 represents a more or less schematic representation of one embodiment of the present invention.
Figure 2:
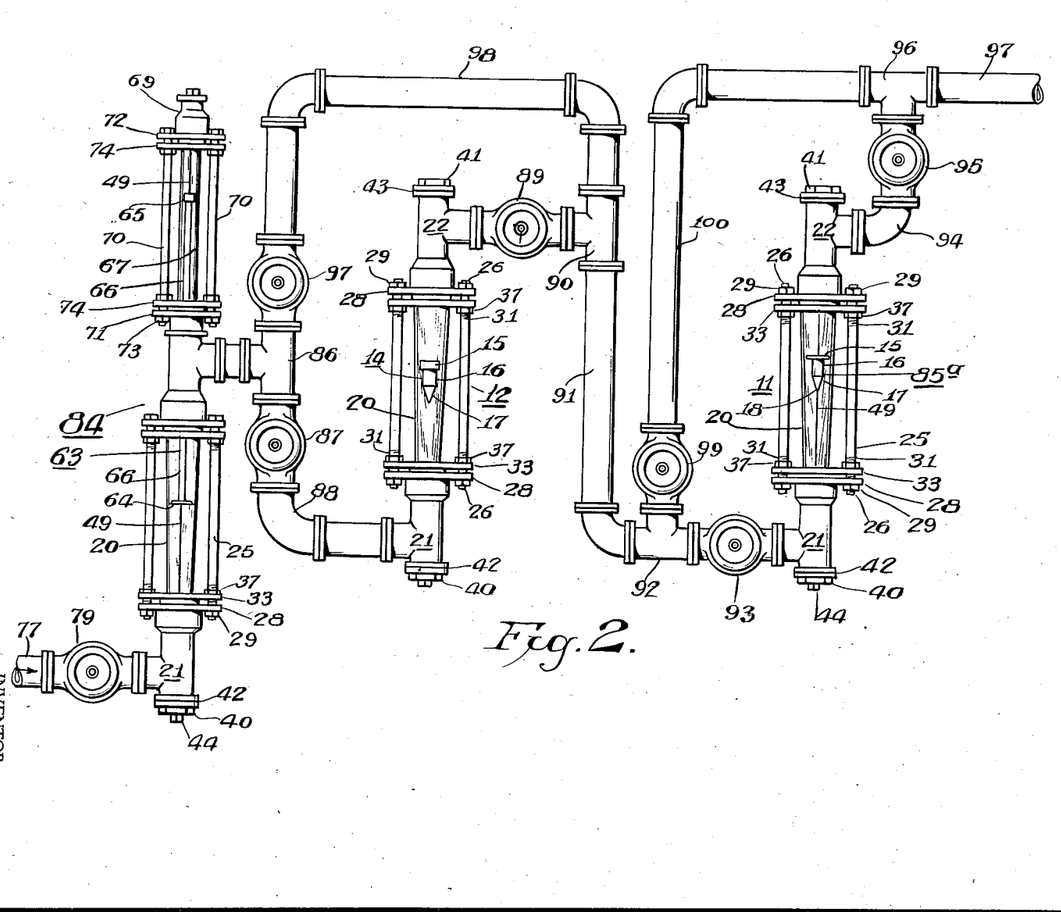
Figure 2 represents a more or less schematic representation of another embodiment of the present invention.
Figures 3, 4, 16, 17, 18:
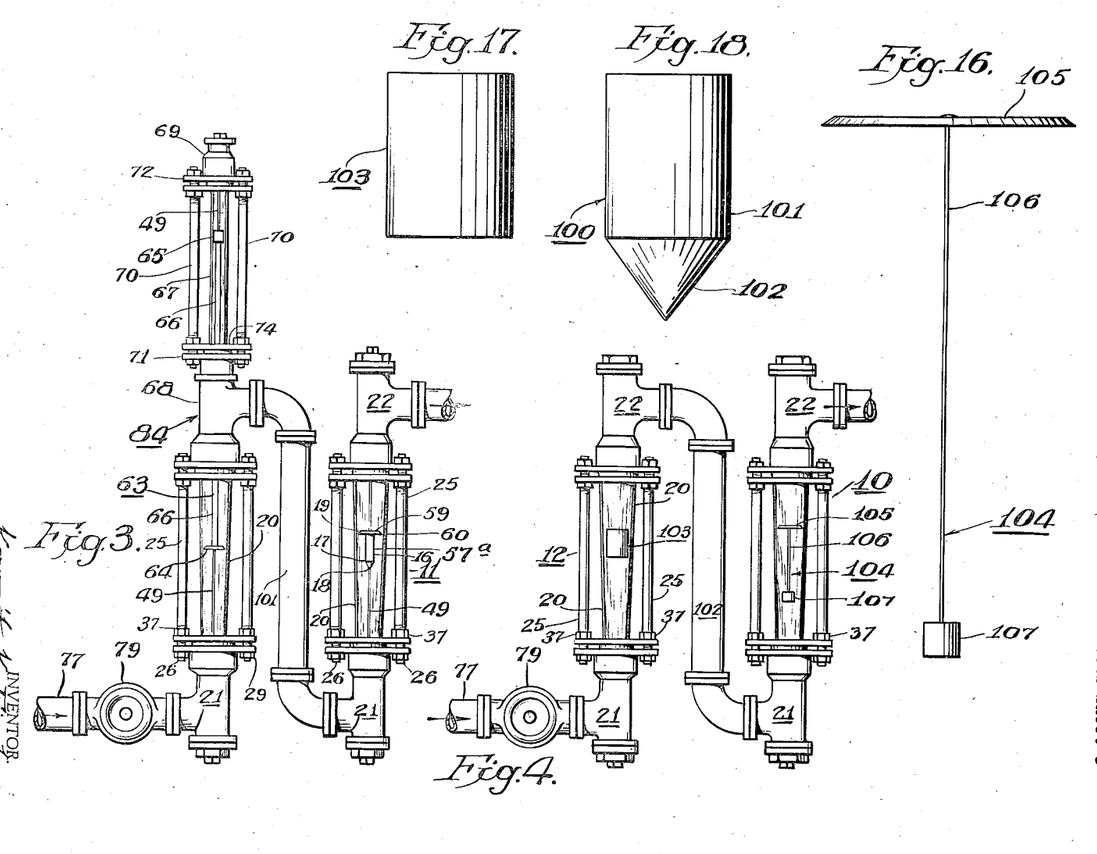
Figure 3 represents a more or less schematic representation of another embodiment of the present invention for determining the specific gravity and the rate-of-flow of a fluid according to the present invention.
Figure 4 represents a more or less schematic representation of another embodiment of the present invention for determining the rate-of-flow and viscosity of a fluid according to the present invention.
Figure 16 represents a front elevational view of another form of the float which may be used in the present invention; said float being relatively insensitive to changes in viscosity.
Figures 17 and 18 represent front elevational views of two further modified forms of floats which may be used in place of floats shown in Figures 10 and 11.

Rotameter 12, as shown in Figures 1, 2 and 4, includes a tapered glass tube 20 which is supported between terminal fittings 21 and 22 to which the fluid line is connected. The fittings 21 and 22 are held together in rigid and spaced relation to each other by a plurality of spacer posts or standards 25 whose reduced and threaded terminal portions 26 pass through corresponding aligned holes 27 in the similar flanges 28 of the fittings 21 and 22. The flanges 28 are held firmly in position between the nuts 29 on the reduced-diameter terminal portions 26 and the shoulders 30 intermediate the reduced-diameter terminal portions 26 and the somewhat larger threaded portions 31 of the posts 25. Similar lower and upper stuffing glands 32, having flanges 33, are provided for compressing suitable packing rings or material 34 within the stuffing box portions or recesses 35 of the fittings 21 and 22, in sealing relation to the ends of the tapered glass tube 20 and the fittings. The flanges 33 are provided with aligned apertures 36 through which the large threaded portions 31 of the posts 25 extend. The nuts 37 serve adjustably to press the stuffing glands into place.

The fittings 21 and 22 are provided with threaded axial openings 38 and 39 which are normally closed by threaded plugs 40 and 41 and intervening sealing gaskets 42 and 43. The lower plug 40 may also have a further screw plug 44 provided therein.

The float 14 (shown in Figure 10) is disposed within the tube 20 and may consist generally of three portions, namely, the "head" part 15, which has the largest diameter and which generally determines the extent of the constriction created in the tapered glass tube; the "body" part 16 which is generally a cylindrical piece below the "head" and is either attached thereto or formed integrally therewith, and the tapered "tail" portion 17 below the "body," and also generally formed integrally therewith, which is either conical or frusto-conical with a small, flat bottom surface 18 upon which the float may be supported in its lowermost position when there is no flow. The lower part of the "head" portion may be slightly tapered, as at 19 in Figure 11; this taper being from five to ten degrees. The purpose of this slight taper has been to increase the capacity of the meter as it will permit of a greater flow capacity for the same sized tube and float.

Figures 8, 9, 10, 11, 14, 15:
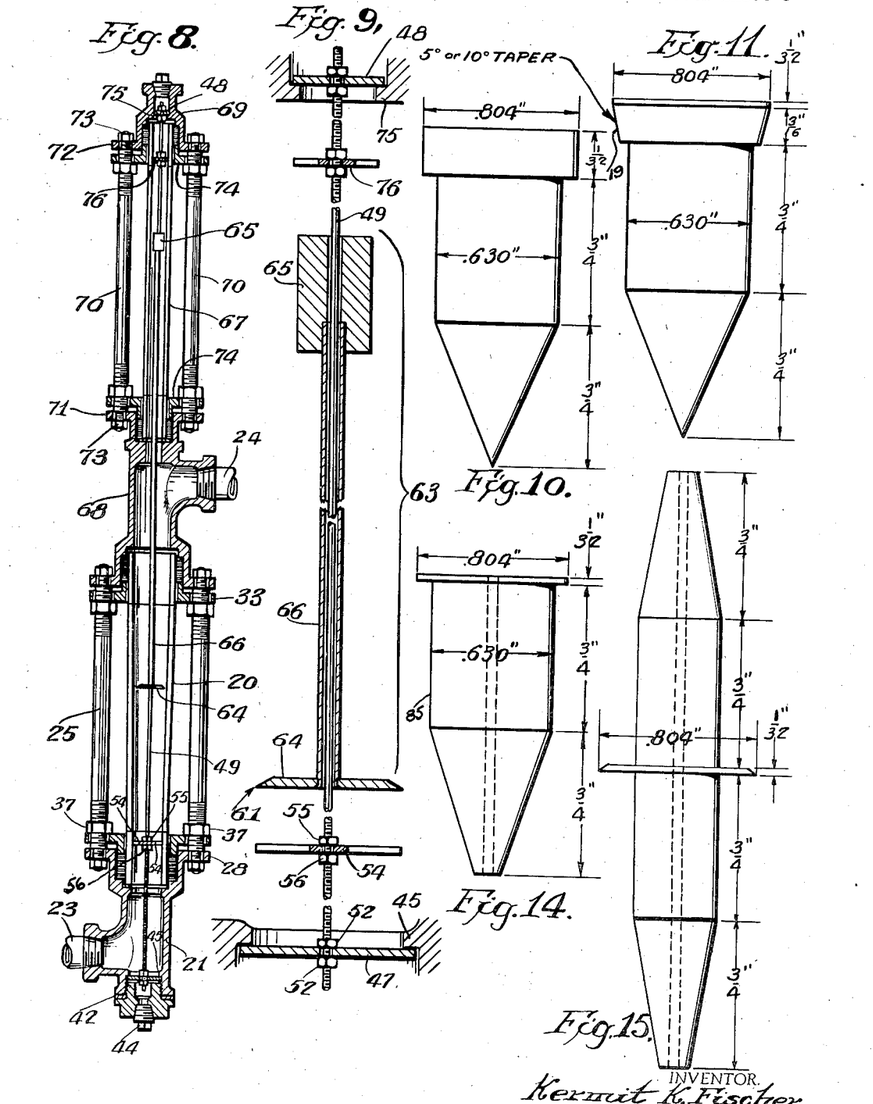
Figure 8 represents a vertical cross-sectional view of another modified embodiment of a rotameter constituting part of the present invention.
Figure 9 represents a fragmentary cross-sectional view on an enlarged scale of some of the elements of the embodiment shown in Figure 8.
Figures 10 and 11 represent front elevational views of two typical rotameter floats of the conventional type heretofore used.
Figures 14 and 15 represent front elevational views of two further modified forms of floats drawn to the same scale as that of Figures 10, 11, 12 and 13.

The "head" portion 15 should have a substantial vertical dimension in relation to the "head" diameter (as for instance of the order of ¼ to ⅓ of the "head" diameter), while the "body" diameter should be of the order of 75% to 85% of the "head" diameter. These proportions are desirable in order to center and stabilize the float within the tapered tube, to prevent any wabbling of the float so that frictional contact between the tube and the float will be minimized and to emphasize the effect of changes in viscosity upon the position of the float.

The construction of the float; that is, the high ratio between the vertical dimension and the diameter of the head portion 15 and also the high ratio between the body diameter and the head thickness makes this float susceptible to and indicative of changes in the viscosity of the fluid as well as in the rate-of-flow of the fluid.

In place of the float 14 I may use a float 100 which is shown in Figure 18 and consists generally of two portions, namely a body portion 101 and a tapered tail portion 102 (that is, the head portion is eliminated and the body portion 100 is made with a greater diameter corresponding to that of the head portion of the float 14).

In place of the float 14 or the float 100, I may use the float 103 shown in Figure 17, which is merely a cylindrical body having a diameter approximating that of the head portion 15 in the float 14 (that is, this float 103 may be considered as having only a body portion; the head portion and the tapered tail portion being omitted).

Figures 5, 6, 7, 12, 13:
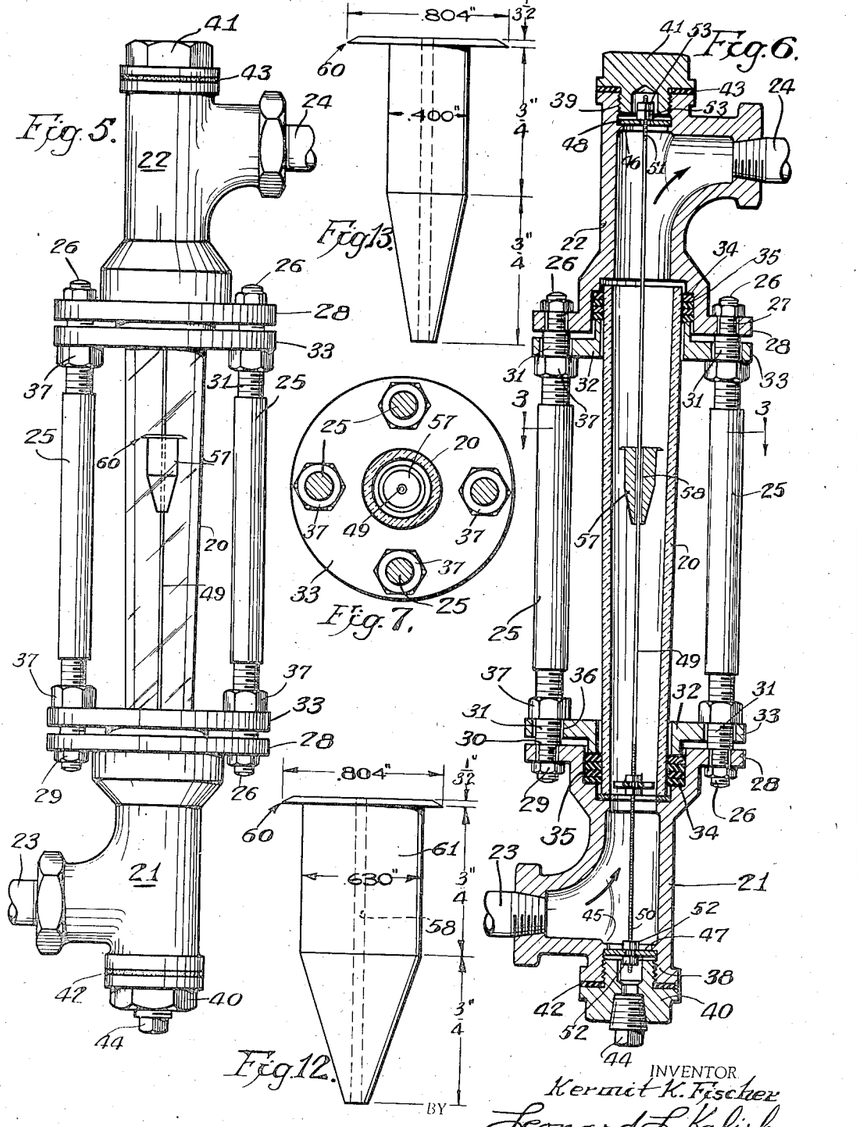
Figure 5 represents a front elevational view of one embodiment of a rotameter constituting part of the present invention.
Figure 6 represents a vertical cross-sectional view of the rotameter shown in Figure 5.
Figure 7 represents a cross-sectional view along the line 3—3 of Figure 6.
Figure 12 represents a front elevational view of the float indicated in Figures 5 and 6, but on an enlarged scale, namely the same scale as that to which the floats illustrated in Figures 10 and 11 are drawn.
Figure 13 represents a front elevational view of still another form of float also drawn to the same scale as that of Figures 10, 11 and 12.

Rotameter 10, as shown in Figures 5 and 6, differs from rotameter 12 in its construction by having its float 57 constructed with a head portion 59 having a substantially smaller vertical dimension, and by centering the float 57 in the tube 20 by a thin, tensioned guide wire 49 passing freely through a small, vertical center hole 58 in the float 57.

This rotameter 10 also contains a tapered glass tube 20 supported between the terminal fittings 21 and 22 to which the pipes 23 and 24 (forming part of the fluid line) are connected. The fittings 21 and 22 are held together in rigid and spaced relation to each other by a plurality of spacer posts or standards 25 whose reduced and threaded terminal portions 26 pass through corresponding aligned holes 27 in the similar flanges 28 of the fittings 21 and 22. Flanges 28 are held firmly in position between the nuts 29 on the reduced-diameter terminal portions 26 and the shoulders 30 intermediate the reduced-diameter terminal portions 26 and the somewhat larger threaded portions 31 of the post 25. Similar lower and upper stuffing glands 32, having flanges 33, are provided for compressing suitable packing rings or material 34 within the stuffing box portions of the recesses 35 of the fittings 21 and 22, in sealing relation to the ends of the tapered glass tube 20 and the fittings. The flanges 33 are provided with aligned apertures 36 through which the large threaded portions 31 of the posts 25 extend. The nuts 37 serve adjustably to press the stuffing glands into place.

The fittings 21 and 22 are provided with threaded axial openings 38 and 39 which are normally closed by threaded plugs 40 and 41 and intervening sealing gaskets 42 and 43. The ower plug 40 may also have a further screw plug 44 provided therein.

Within the aligned apertures 38 and 39, similar inwardly extending flanges 45 and 46 are formed, which provide annular shoulders or abutments for supporting wire anchorage plates or washers 47 and 48. The wire anchorage plates or washers 47 and 48 are centrally apertured. The thin guide wire 49, which is threaded at its lower and upper ends as at 50 and 51, passes through the apertures in the anchorage plates 47 and 48, and is held therebetween by nuts 52 and 53 threaded thereon. The wire 49 is placed under sufficient tension so as to maintain it under slight tension at all times, notwithstanding the temperature changes encountered in operation. Thus, sufficient tension is placed upon the wire, so that upon expansion due to increase in the temperature, it will still remain taut. A multi-spoked centering member 54 is also supported on the wire 49 by nuts 55 and 56, which together act accurately to center the wire in relation to the lower inner diameter of the tapered tube, and also to act as a bottom stop for the float; the center member 54 comprising a centrally apertured hub portion and three or more comparatively thin radial spokes extending laterally therefrom and fitting within the lower inner diameter of the tube with a sufficiently small clearance so as accurately to center the wire.

The float 57 is formed of a material having a specific gravity substantially greater than that of the liquid to be handled (or the float may be made of a lighter material suitably weighted) and is provided with a center vertical aperture 58 extending therethrough, of a diameter just sufficiently greater than the diameter of the wire 49 as to afford such working clearance as will permit the free travel of the float in relation to the wire 49.

As shown in Figure 12, the vertical dimension or thickness of the "head" 59 of the float 57 is reduced to a small fraction of the thickness of the "head" (of heretofore conventional types of floats such as 14). Thus, for instance, whereas the thickness of the "head" 15 of the float 14 is of the order of ⅓ of the diameter of the "head" of the float, the thickness of the "head" 59 of the float 13 is of the order of 1/25 of the "head" diameter. This reduction of the thickness of the "head" to less than 1/20 of the "head" diameter illustrated in each of Figures 5, 6, 12, 13 and 14, reduces the viscosity effect to about ½ of the former effect. By beveling the periphery of the head 59 to a knife edge as shown in Figures 5, 6, 12 and 13, a further reduction of viscosity coefficient is obtained; this reduction being of an order of approximately an additional 15%. In this form of construction, the knife edge 60 has a vertical thickness of the order of .01 to .005 inch.

By reducing the diameter of the "body" portion 61 of the float, to the order of about ½ of the head diameter or less, as illustrated in Figure 13, the viscosity coefficient is further reduced in the order of approximately ten percent. As the resulting reduction in the weight of the float tends to decrease the capacity of the rotameter, I may either lengthen the "body" beneath the "head," or add an additional "body" portion 62 above the float as indicated in Figure 15.

In order further to reduce the viscosity coefficient (due to the viscous "drag" of the liquid on the float), I have provided a further modified form of construction illustrated in Figures 8 and 9 in which the float designated generally by the number 63 in formed of a thin "head" 64 having the thickness-to-diameter relationship of the "heads" 59 in Figures 12, 13 and 15, and having the knife edge 61, but whose weight-giving "body" 65 is spaced substantially below or above the "head" portion 64 by means of a thin connecting tubular spacer member 66; the "head" 64 alone being disposed in the tapered tube 20, while the weight-giving "body" portion 65 is disposed within an auxiliary tube 67 outside the path of liquid flow, said tube 67 being of glass or metal or other suitable material and being held between the modified upper fitting 68 and the auxiliary fitting 69. This modified form of rotameter construction may be designated as 84. While in Figures 8 and 9 the auxiliary tube 67 and the float "body" 65 are shown as being above, this can be reversed by merely turning the entire unit upside down (from the position shown in Figures 8 and 9), and mounting the thin end of the tapered tube 20 in the modified fitting 68 while the larger-diametered end of the tube 20 will be in the fitting 21. In this modified form of construction 84, the fittings 68 and 69 are held together through posts 70 and flanges 71 and 72 and nuts 73, in a manner similar to the retention of the fittings 21 and 22 shown in Figures 5 and 6. The tube 67 is similarly held in sealed relation by stuffing glands 74. In place of the inwardly extending flange 46, however, a similar flange 75 is provided in the upper fitting 69 which holds the anchorage plate 48 in the same manner. The upper spacer and stop member 76 may also be provided on the wire 49. By this construction, the viscosity coefficient is reduced to a minimum and practically the full area of the tapered metering tube is available for fluid passage. The "drag" on the connecting spacer tube 66 is very small because the velocity of the liquid is reduced around the spacer tube 66 because of the increased area provided for the passage of the liquid. The weight-giving "body" 65 being in a stagnant body of liquid either above the outlet as shown in Figures 8 and 9 or below the outlet (by a reversal of positions), it is not subject to frictional "drag."

On larger sized floats, it is not necessary to reduce the "head" thickness as much as on the smaller floats illustrated. Thus, for instance, on a float having a "head" diameter of approximately three inches, a sufficient reduction of viscosity effect is obtained by reducing the "head" height or "head" thickness from the ⅞ of an inch shown in float 14 to about ⅛ of an inch. In general, in this type of construction I contemplate the "head" height of "head" thickness not greater than five to ten percent of the "head" diameter.

The rotameter construction shown at 10 or at 84 is (due to the construction of its float) unaffected by changes in the viscosity of the fluid being metered. Since, as mentioned above, the float 57 or 63 is made substantially denser than the fluid being metered, the position of the float is more or less unaffected by changes in the specific gravity of the fluid. Thus, the position of the float in this rotameter 10 or 84 will be determined only by the rate-of-flow of the fluid, being unaffected by changes in viscosity or changes in specific gravity.

I prefer to weight the floats hereinabove described (including floats 13, 14, 100, 103, 57, 63 and 85) by employing a very appreciably denser material, as for example mercury or lead. Where the float is of the type of 13, 14, 57, 85, 100 or 103 the weighting material (either the lead or the mercury) is placed in the interior of the body portion at a point preferably somewhat below the center of gravity of the float to provide the needed weight and to ensure stability.

Where the float is of the type of 63 the weighting material is placed within the portion 65 which is outside the path of liquid flow.

Any of the floats herein described may be constructed of any suitable material having the required physical properties as for eample metals or metal-alloys or synthetic resins etc. However, due to the fact that these flow meters are frequently used in chemical plants on corrosive liquids it is frequently desirable to construct the float (or that portion of the float which is exposed to the corrosive liquid as for example the head 64 of the float 63 in rotameter 84) of a material which is highly resistant to corrosive action. Thus, I may construct the float (or the exposed portions of the float) of stainless steel, tantalum or other inert and resistant metals or alloys.

In place of the construction hereinabove described in which a guide wire 49 is used to center and to stabilize the floats 13, 57 or 85, I may provide a construction in which the guide wire 49 is eliminated (so that it is possible to employ the more simplified construction of rotameter 12 with respect to the tube portion 20 and the members 21 and 22) by employing a further modified float 104 which is shown in Figure 16. This float 104 may consist of the thin (and preferably knife-edged) head 105, a relatively thin, downwardly-depending connecting portion 106 and a lowermost, weighted body member 107. In this construction the connecting portion 106 is made relatively long and the body portion 107 is made much denser than the remainder of the float 104. As a result of this construction the float 104 has its center of gravity at a point considerably below the head portion and this produces a stabilizing effect (that is, the weight 107 acts as the bob of a long pendulum which has a correspondingly long moment or rate of oscillation). Thus, the head portion 105 will tend to remain relatively stable and to be relatively free of gyration, wobbling and other undesired lateral movements.

As stated hereinabove, the floats 14, 100 and 103 are affected to a much greater extent by the viscosity of the fluid being metered and by changes in the viscosity of said fluid than are the floats of the construction of 13, 57, 63, 85 and 104. This is due to the fact that the floats 14, 100 and 103 present a much greater area in the zone of rapid fluid viscosity. In other words, these floats 14, 100 and 103 have a much greater viscous drag surface than have the floats 13, 57, 63, 85 and 104; the phrase "viscous drag surface" being defined as the surface area in the zone of relatively rapid fluid viscosity or the area in the zone of maximum constriction in the fluid path.

I may also provide still another rotameter 11, which is identical with rotameter 10 in every respect except that its float 57a is made appreciably lighter; its density being selected in such a manner as to be only a trifle greater than the greatest expected density of the fluid being metered. Or, in place of a rotameter 84, rotameter may be provided which is identical with rotameter 84 except that it has a lighter float which is just a little denser than the greatest expected density of the fluid being metered.

Because of the fact that these floats have almost the same density as that of the fluid being metered, variations in the specific gravity of the fluid will affect the position of the floats to a considerable extent. Due to the construction of the floats, these rotameters will be more or less unaffected by changes in the viscosity of the fluid being metered.

Thus, fluctuations in the position of the float in the rotameter 10 or 84 indicate changes in rate-of-flow alone; changes in the position of the float in rotameters 11 or 84 (with the lighter float) indicate changes in rate-of-flow or changes in specific gravity or both but not changes in viscosity; and finally changes in the position of the float in rotameter 12 indicate changes in the rate-of-flow or changes in the viscosity but not changes in the specific gravity.

I will now describe a process for determining the specific gravity and the viscosity of a fluid in motion which is part of my present invention.

As shown in Figure 1 for example, the fluid being measured, as for instance fluid flowing through the pipe line 77, is preferably by-passed by closing the main line valve 78 and opening the shut-off-and-control valve 79 and the shut-off valve 80. Between the valve 79 and the valve 80 are arranged three rotameters in series that is, the fluid enters the lower inlet port of the first rotameter, leaves by the upper and outlet port of said first rotameter and is piped through the line 81 from said outlet port to the lower inlet port of the second rotameter from where it leaves by the upper outlet port to be again led through the line 82 to the lower inlet port of the third rotameter, similarly leaving by the upper outlet port thereof to pass through the line 83 and the valve 80 back to the main pipe line 77. In Figure 1, I show the first rotameter as being 10 (or 84), the second rotameter as being 11 and the third rotameter as being 12, that is for purposes of illustration only; it being understood that any reversals of positions would be equally effective, provided only that the three rotameters were connected in series. Thus, the order could be 11, 12, 10, or 12, 10, 11, or 10, 12, 11, or 12, 11, 10, or 11, 10, 12.

In carrying out the process constituting part of the present invention, I permit the fluid to be fed through the by-pass. The shut-off-and-control-valve 79 is manipulated by either manual or automatic operation to provide a constant rate-of-flow through the by-pass; the valve being regulated to maintain the reading on the rotameter 10 (or 84) constant. Since the fluctuations in the reading of rotameter 11 are the product of two component factors, namely changes in the rate-of-flow and changes in specific gravity and since the rate-of-flow is being maintained constant as shown by rotameter 10, any variations in the reading on rotameter 11 must be due to changes in specific gravity alone. From these changes, it can be seen that the changes in specific gravity from reading to reading can be readily calculated. This may be done either by a direct-reading scale on the rotameter 11 precalculated for specific rates-of-flow or by a suitable chart or charts or a suitable graph from which, by means of the reading on the rotameter, the specific gravity or the change in specific gravity can be readily calculated.

Since the changes in readings of rotameter 12 are determined by the rate-of-flow and changes in the viscosity, and since the rate-of-flow is maintained constant as shown by rotameter 10 (or 84), any changes in the reading of rotameter 12 must be due to changes in the viscosity of the fluid. Again, the viscosity or change in viscosity can be calculated by a direct reading from the rotameter or by suitable charts or graphs.

My present invention, therefore, provides a quick dependable and accurate method for determining both the specific gravity and the viscosity of a fluid in motion and involves only the simple steps of manipulation of the control valve 79 to maintain the reading on rotameter 10 (or 84) constant, plus a reading of rotameters 11 and 12.

While Figure 1 shows a unit using rotameters 10, 11 and 12 for determination of both specific gravity and viscosity, I contemplate the use of also a pair of rotameters as for example rotameter 84 (or 10) plus rotameter 11 to determine only the rate-of-flow and the specific gravity as shown in Figure 3, or rotameter 10 (or 84) plus rotameter 12 to determine rate-of-flow plus viscosity as shown in Figure 4, or I may employ a combination of several pairs at different points in the line as for example 10 and 11 at one point and 10 and 12 at another.

It is possible to obtain such specific gravity and viscosity plus rate-of-flow readings at intervals by opening valves 79 and 80 while closing valve 78 and, after the reading has been completed, to shut off the rotameter unit by opening valve 78 and closing valves 79 and 80 or, it is possible to obtain continuous rate-of-flow, specific gravity and viscosity readings by maintaining the valves 79 and 80 open continuously. It is, of course, possible to insert the unit of two or three rotameters directly in the main pipe line 77 as shown in Figures 2, 3 and 4; it is preferred, however, to connect them by means of a by-pass as shown in Figure 1 in order to facilitate clean-out or flushing operations on the rotameters or repairs on the rotameters, without the necessity for shutting off the flow in the main line 77.

In Figure 2 is shown another arrangement in which the rotameters may be set up, in this case the arrangement being such that it is possible to cut-out either the rotameter measuring specific gravity or the rotameter measuring viscosity or both.

When it is desired to measure both specific gravity and viscosity, valves 97 and 99 are closed while valves 79, 87, 89, 93 and 95 are open. The fluid passes from the main pipe line 77, through the control valve 79, the rotameter 84 (which measures rate-of-flow), the T 86, the valve 87, the pipe 88, the rotameter 12 (which measures viscosity), the valve 89, the T 90, the pipe 91, the T 92, the valve 93, the rotameter 11 (which measures specific gravity), the pipe 94, the valve 95, the T 96, and the pipe line 97.

When it is desired to determine only the rate-of-flow by means of the rotameter 84, valves 87, 89, 93 and 95 are closed while valves 79, 97 and 99 are opened. In this case, the fluid passes from the pipe line 77 through the valve 79, the rotameter 84, the T 86, the valve 97, the pipe line 98, the T 90, the pipe line 91, the T 92, the valve 99, the pipe line 100, the T 96 and the pipe line 97.

Where it is desired to determine only the rate-of-flow and the viscosity, valves 97, 93 and 95 are closed while valves 79, 87, 89 and 99 are open. In this case the fluid passes from the pipe line 77, through the valve 79, the rotameter 84, the T 86, the valve 87, the pipe line 88, the rotameter 12, the valve 89, the T 90, the pipe line 91, the T 92, the valve 99, the pipe line 100, the T 96 and the pipe line 97.

When it is desired to measure only the rate-of-flow and the specific gravity, the valves 87, 89 and 99 are closed while the valves 79, 97, 93 and 95 are opened. In this case the fluid passes from the pipe line 77, through the valve 79, the rotameter 84, the T 86, the valve 97, the pipe line 98, the T 90, the pipe line 91, the T 92, the valve 93, the rotameter 11, the pipe line 94, the valve 95, the T 96, and the pipe line 97.

As described in Figure 1, the rate-of-flow is maintained constant by manual or automatic manipulation of the valve 79, as shown by the rotameter 84 (which is that shown in Figure 8, and whose float 63 has an appreciably higher specific gravity than that of the fluid). From the reading on the rotameter 84, it is possible to calculate the viscosity and the changes in viscosity from the readings on the rotameter 12; the float 14 being more or less insensitive to changes in specific gravity but being affected by viscosity and rate-of-flow. From the reading on the rotameter 84, it is possible to calculate the specific gravity of the fluid from the reading of the rotameter 11; the float 85a being unaffected by changes in viscosity but being affected by changes in specific gravity (since the specific gravity of the float is only slightly greater than the specific gravity of the fluid) and in rate-of-flow.

The particular arrangement shown in Figure 2 is for purposes of illustration only, it being possible to connect the rotameters in other orders as indicated previously, provided only that they are connected in series.

In Figure 2, rotameter 84 is the same as that shown in Figure 8, rotameter 12 employes a float 14 of the so-called "conventional" type having a relatively thick head and body as indicated in Figure 6 and requiring no guide wire, while rotameter 11 is similar to that shown in Figure 5 except that it employs a float 85a which is similar to that (85) shown in Figure 14 except that it has a relatively lower specific gravity than that of the one shown in Figure 14 (85).

In Figure 3 is shown another form of apparatus embodying the present invention by means of which the determination of rate-of-flow and of specific gravity can be made. In this case, rotameter 84 is used for determination of the rate-of-flow and contains the float 63 which has an appreciably higher specific gravity than that of the fluid being metered. By maintaining the rate-of-flow constant (through manual or automatic manipulation of the valve 79), as shown by the reading of the float 63, the specific gravity and the changes in specific gravity can be determined by the readings of the two floats and by the fluctuation in the position of the float 57a in rotameter 11 (rotameter 11 being used to determine specific gravity and having the float 57a which has only a slightly greater specific gravity than that of the fluid being metered). As shown, the two rotameters 84 and 11 are connected in series with the intervening pipe line 101. In Figure 3, rotameter 84 is shown as being first; this, however, is not essential, since rotameter 11 may be put first and 84 second.

In Figure 4 is shown another form of apparatus embodying the present invention by means of which the rate-of-flow and the viscosity and changes in viscosity may be determined. In this case, rotameter 12 which measures viscosity and changes in viscosity is shown as being first (and containing the float 103 which has a large-diameter body while the trotameter 10 which determines rate-of-flow is shown as being second (this employed the float 104 of Figure 15, shown in Figure 16, which has an appreciably higher specific gravity than that of the fluid being metered and which does not employ a guide wire) with the intervening pipe line 102. Here again, the relative order is not essential since rotameter 10 may be placed first and rotameter 12 second. By maintaining the rate-of-flow constant as indicated by the position of the float 13 in the rotameter 10 (by manual or automatic manipulation of the valve 79), the rate-of-flow may be determined by calculation based upon the reading of the float 14 and the fluctuations in the position of said float 14.

The apparatus shown in Figures 1, 2, 3 and 4 are illustrative; it being understood and intended that the present invention may be embodied in and/or practiced by other variant forms of apparatus without departing from the spirit of the present invention. Thus, the numeral 10 is meant to designate generally a rotameter which measures the rate-of-flow and may employ any float (having an appreciably higher specific gravity than that of the fluid being metered) of the character shown in Figure 12 (103), in Figure 13 (57), in Figure 14 (85), in Figure 15 (13) and other possible modifications. Rotameter 11 is intended to designate generally a rotameter measuring specific gravity and being similar in construction with that shown in rotameter 10 except that it employs a float which is only slightly greater in specific gravity than is the fluid being metered. In this case, floats 103a, 57a, 85a and 13a may be used, these being similar to 103, 57, 85 and 13 respectively, except that they are relatively lower in specific gravity.

Rotameter 84 is intended to designate a rate-of-flow metering device having the float 63 which has an appreciably higher specific gravity than that of the fluid being metered. By employing a float 63a (which is identical with 63 but has only a slightly greater specific gravity than has the fluid) this rotameter 84a may be used for determining specific gravity instead.

Rotameter 12 is intended to designate a rate-of-flow rotameter which measures viscosity and which employs the float 14 having a substantially greater specific gravity than that of the fluid. The float 14 is shown in Figure 10 (a slightly modified form being shown in Figure 11) and requires no guide wire 49 since it is self-centering.

Similarly, the piping arrangements shown in Figures 1, 2, 3 and 4 are for purposes of illustration only, it being understood that many other arrangements are possible and are contemplated.

It is possible to integrate the several rotameters automatically so that direct readings of specific gravity and/or of viscosity may be made from the respective meters.

In carrying out the present invention, the apparatus of the present invention may be of a smaller capacity than the main flow through the pipe line to which it is connected, so that only a fractional part of the main flow can ever be diverted to and through the apparatus of the present invention. This fractional part of the main stream of fluid may be permitted to flow through the apparatus of the present invention continuously with a valve preferably at the inlet leading to the apparatus through which the flow may be throttled to a predetermined rate-of-flow through the apparatus to which the several indicators may be calibrated. Thus, for instance, by this means the apparatus of the present invention may be of comparatively small size, in contrast to the main pipe line in the main fluid stream to which it is applied. Thus, for instance, to a 3, 4, 5 or 6 inch pipe, the apparatus of the present invention may be applied which has only a one-half inch pipe inlet and perhaps with a flow capacity of a few gallons per minute (whereas the main fluid flow through the main pipe line to which the apparatus is attached may have a rate-of-flow capacity many times greater). The meter 10, for example, being calibrated for direct reading of rate-of-flow covered by the range of the apparatus, the valve 19 is adjusted or closed down sufficiently to throttle the flow to some predetermined rate-of-flow (to be gauged by the meter 10), as for instance two gallons a minute; the indicators 11 and 12 having been calibrated to give a direct reading of specific gravity and viscosity, respectively, with the rate-of-flow of two gallons per minute.

However, this small fractional by-pass may be shut down whenever no reading is desired, by simply closing the valve 79 completely.

If desired, the apparatus may be of a capacity as great or substantially as great as the capacity of the pipe line to which it is applied, as shown in Figure 1, so that the entire fluid stream may be by-passed through the apparatus thereby permitting a measurement of rate-of-flow also at the same time. By again throttling down the valve 79, however, the rate-of-flow may be held constant at the predetermined amount to which the indicators 11 and 12 are calibrated for direct reading of specific gravity and viscosity.

The foregoing two principles of the present invention have the advantage of not interfering with the main flow of fluid. However, where the industrial process or principle in which the apparatus of the present invention is to be used is such that a momentary throttling down of the flow in the main pipe will not be harmful or where the main flow can be throttled down for short intervals sufficient to take a specific gravity and viscosity reading without adversely affecting any industrial operation in which the flow is involved, then the apparatus of the present invention may be placed directly in the main line as shown in Figure 2, without any by-passing whatever, and the entire stream permitted to flow through the entire apparatus at all times with merely the valve 79 at the head of the apparatus to throttle the flow temporarily to the predetermined rate-of-flow to which the indicators 11 and 12 are calibrated for the direct reading of specific gravity and viscosity respectively.

In addition to the foregoing embodiments of the present invention, a direct reading of specific gravity and viscosity may also be obtained without fixing the rate-of-flow to any predetermined amount, by suitably interconnecting the specific gravity meter 11 with the rate-of-flow indicating meter 10 and by suitably interconnecting the viscosity indicating meter 12 with the rate-of-flow indicating meter 10. This can be accomplished either by mechanical interconnection through rods extending through suitable stuffing glands or electromagnetically by induction coils disposed in operative relation to the floats or to extensions carried by the floats.

If it is not desired to maintain the rate-of-flow at a predetermined rate through the apparatus during the reading of viscosity and specific gravity, the relationship between rate-of-flow and viscosity and also the relationship between rate-of-flow and specific gravity may be charted on a series of curves, so that by taking off simultaneous readings of rate-of-flow and specific gravity, the specific gravity can be obtained by reference to the curve and likewise by taking off simultaneous readings of rate-of-flow and viscosity, the viscosity can be obtained by reference to the corresponding curve. In this latter case, however, the specific gravity and viscosity indicators would not be calibrated for a direct reading of specific gravity or viscosity respectively, but would only be calibrated to some arbitrary viscosity or specific gravity coefficient or factor against which the curves could then be applied.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new and desired to be secured by Letters Patent is:

1. A method for determining the viscosity of a moving fluid which comprises passing said fluid through a variable-orifice constant-pressure-drop flow-meter relatively insensitive to changes in viscosity, and passing said fluid through a variable-orifice constant-pressure-drop meter sensitive to and affected by changes in rate-of-flow and changes in viscosity, said meters being connected in series.

2. A device for determining the viscosity of a moving fluid comprising a variable-orifice constant-pressure-drop flow-meter relatively insensitive to changes in viscosity and a variable-orifice constant-pressure-drop meter sensitive to and affected by changes in rate-of-flow and changes in viscosity, said meters being connected in series.

3. A device for determining the viscosity of a moving fluid which comprises a rate-of-flow indicating rotameter relatively insensitive to changes in a viscosity and rotameter sensitive to and affected by changes in rate-of-flow and changes in viscosity, said rotameters being connected in series.

4. A device for determining the viscosity of a moving fluid comprising a rotameter including a vertically elongated metering tube and a metering float adapted for up-and-down movement within said tube and responding to rate-of-flow while being substantially unaffected by changes in viscosity, said float having a generally vertically extending weight-giving body portion and a generally transversely extending head portion, the thickness of said head portion being not greater than ten per cent of the diameter of the transverse dimension thereof, said body portion having a transverse dimension appreciably less than the transverse dimension of said head portion, said float having a density appreciably different from the density of the fluid; and a second rotameter including a vertically elongated metering tube and a metering float adapted for up-and-down movement within said tube and responding to both rate-of-flow and changes in viscosity, said float having a generally vertically extending weight-giving body portion and a generally transversely extending head portion, said head portion having a thickness at least twenty-five per cent of its transverse dimension, said float having a density appreciably different from the density of the fluid; said rotameters being connected in series.

5. A device for determining the viscosity of a moving fluid comprising a rotameter including a vertical metering tube and a float adapted for up-and-down movement within said tube, said float having a generally vertically extending body portion and having an annular thin generally transversely extending head portion, said float having a density appreciably different from the density of the fluid, the position of said float within said tube being dependent upon the rate-of-flow of fluid and being generally unaffected by changes in viscosity of said fluid; and a second rotameter including a vertical metering tube and a float adapted for up-and-down movement within said tube, said float having a vertical dimension in the zone of its maximum transverse dimension of at least twenty-five per cent of said maximum transverse dimension, said float having a density appreciably different from the density of the fluid, the position of said float within said tube being dependent upon the rate-of-flow of fluid and also being dependent upon the viscosity of the fluid; said rotameters being connected in series.

6. A device for determining the viscosity of a moving fluid comprising a rotameter including a calibrated tapered metering tube, a co-axial elongated chamber spaced from said metering tube outside the path of fluid flow and in communication with said metering tube, a metering float having a relatively thin head portion disposed within said metering tube and a weight-giving body portion disposed within said elongated chamber and a relatively thin spacer portion interconnecting said head and body portions, said metering float having a substantial negative buoyancy with respect to the fluid; and a second rotameter including a calibrated tapered metering tube, a metering float therein having a generally vertically extending weight-giving body portion and a generally transversely extending annular head portion, said body portion having a transverse dimension of approximately seventy-five to eight-five per cent of the maximum transverse dimension of said head portion, said head portion having a vertical dimension in the zone of its maximum transverse dimension of approximately twenty-five to thirty-five per cent of said maximum transverse dimension, said metering float having a substantial negative buoyancy with respect to said fluid; said rotameters being connected in series.

KERMIT K. FISCHER.